United States Patent
Brown et al.

(10) Patent No.: US 7,102,781 B2
(45) Date of Patent: Sep. 5, 2006

(54) APPARATUS AND METHOD FOR INITIATING A PRINTING OPERATION FROM A PRINTER

(75) Inventors: Mark L. Brown, Boise, ID (US); Vincent C. Skurdal, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 10/189,026

(22) Filed: Jul. 3, 2002

(65) Prior Publication Data

US 2004/0004734 A1    Jan. 8, 2004

(51) Int. Cl.
  *G06F 3/12* (2006.01)
  *G06K 15/00* (2006.01)
(52) U.S. Cl. .................... 358/1.15; 358/1.14
(58) Field of Classification Search ........ 358/1.1–1.18; 709/223–232, 319–321; 710/7, 8, 19, 31–47
See application file for complete search history.

(56) References Cited

U.S. PATENT DOCUMENTS

| 6,016,386 | A | 1/2000 | Nosaki et al. |
| 6,333,790 | B1 * | 12/2001 | Kageyama .................. 358/1.15 |
| 2001/0052994 | A1 | 12/2001 | Murata |
| 2003/0011633 | A1 * | 1/2003 | Conley et al. |

FOREIGN PATENT DOCUMENTS

| JP | 02086469 | 3/1990 |
| JP | 06245179 | 2/1993 |
| JP | 08108599 | 4/1996 |
| JP | 10058758 | 3/1998 |

* cited by examiner

Primary Examiner—Douglas Q. Tran

(57) ABSTRACT

A printer comprises at least one print control that can be operated by a user. In response to operation of the print control, the printer generates and transmits a request from the printer to a general purpose computer that has data stored in it. The request contains information to cause the computer to execute a print operation. The printer prints the data received from the computer.

10 Claims, 4 Drawing Sheets

APPARATUS AND METHOD FOR INITIATING A PRINTING OPERATION FROM A PRINTER

FIELD OF THE INVENTION

The present invention relates to computer systems generally, and more specifically to a printer connectable to a computer.

BACKGROUND OF THE INVENTION

Printers for computers have increased in functionality over the years. One of the features available on some high-end printers is the multiple copy or "mopier" feature. Printers having this function include a memory device (e.g., flash memory or a hard disk drive) that can store data. After a print operation is initiated on the computer, the data that are transmitted to the printer for printing are also stored in the memory of the printer. The user has the option of printing additional copies by using the multiple copy control on the printer to reprint the data that have been stored in the memory of the printer.

A printer having additional or alternative capabilities is desired.

SUMMARY OF THE INVENTION

An exemplary method for printing comprises the steps of: (a) receiving a signal at a printer; (b) transmitting a request in response to the signal for initiating a print operation that has not previously been initiated, the request being transmitted from the printer to a general purpose computer that has data stored therein; (c) receiving the data from the computer at the printer after transmitting the request; and (d) printing the data in the printer.

An exemplary method for computing comprises the steps of: (a) executing at least one program in a processor of a general purpose computer; (b) receiving a request signal from a printer coupled to the computer; (c) causing the at least one program to execute a print operation, which has not previously been initiated in the general purpose computer, in response to the request signal from the printer.

An exemplary printer comprises: at least one print control that can be operated by a user; a processor responsive to operation of the print control for generating and transmitting a request from the printer to a general purpose computer that has data stored therein, the request containing information to cause the computer to execute a print operation that has not previously been initiated in the general purpose computer; and a print mechanism for printing data received from the computer.

An exemplary computer comprises: a processor capable of executing at least one program, the processor having data stored therein that are used or generated by the program, an input for receiving a request from a printer coupled to the computer, and memory encoded with computer program code responsive to the request message for executing a print operation that has not previously been initiated in the general purpose computer, the print operation transmitting the requested data to the printer.

DETAILED DESCRIPTION

Figure 1:
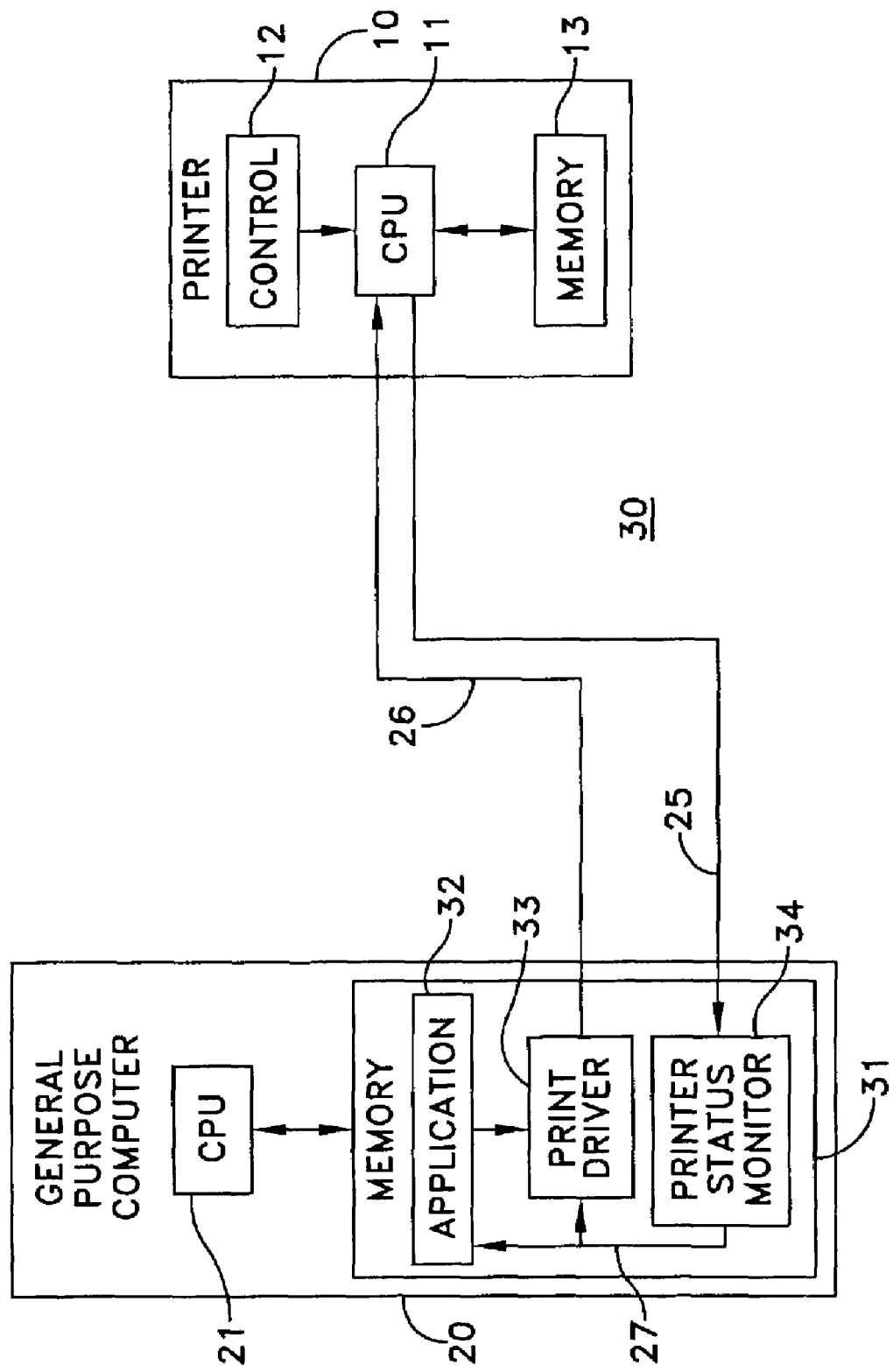
FIG. 1 is a block diagram of an exemplary system according to an embodiment of the present invention.
Figure 2:
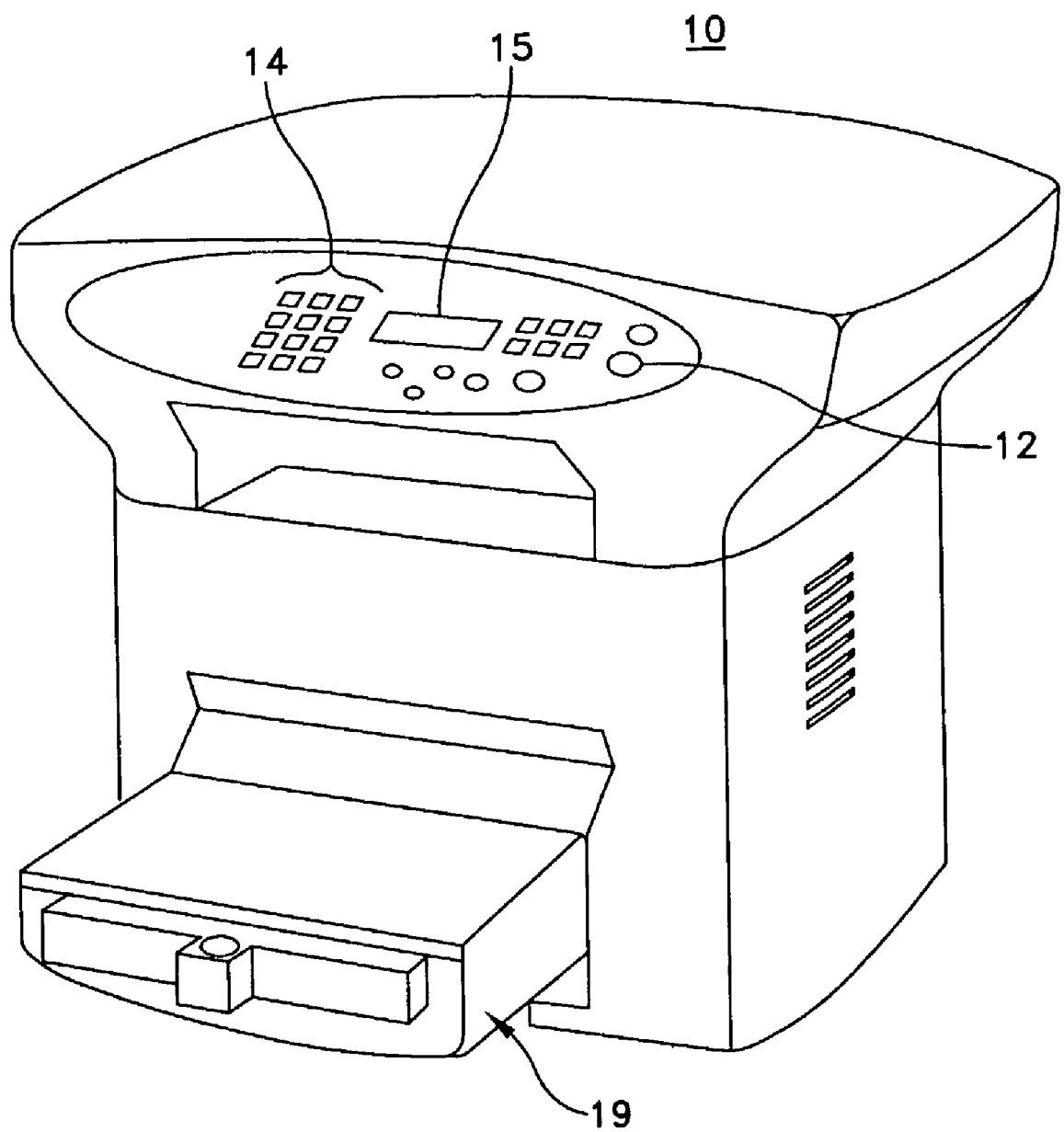
FIG. 2 is an isometric view of an exemplary embodiment of a printer operable in the system of FIG. 1.

FIG. 1 shows a system 30 in accordance with an exemplary embodiment of the invention. The system 30 comprises a printer 10 and a general purpose computer 20. FIG. 2 is an isometric view of an exemplary printer 10.

The printer 10 includes means for printing graphics and data, which may include any suitable paper feed 19 and printing mechanism (not shown). Printer 10 may be, for example, a laser printer, an inkjet printer, a bubble jet printer or the like. The printer may be included in an all-in-one device or multi-function peripheral (MFP) device that prints from an attached computer and also performs one or more additional function(s), such as scanning, facsimile, and/or photocopying. For example, the printer 10 shown in FIG. 2 represents an MFP device that includes such functions.

The printer 10 includes at least one print control that can be operated by a user. The exemplary print controls may include a print start button 12, a plurality of setting control buttons 14 and/or a touch-sensitive display input device 15, or the like. In an exemplary embodiment, a single print start button 12 (or other single control, such as a switch, sensor, touch activated display, wired or wireless remote control, or the like) may be used to initiate a print operation that has not previously been initiated from the printer 10 without requiring further interaction between the user and the computer 20.

The printer 10 includes means responsive to operation of the print controls 12, 14, 15 for generating and transmitting a request message 25 to the computer 20. The message generating and transmitting means includes a processor such as central processing unit (CPU) 11 or microcontroller executing computer program code that is resident in a memory 13 in the printer 10. In alternative embodiments, an ASIC or an IC card may be coupled to the control(s) 12, 14 and/or 15 to transmit a request message 25 to the computer 20 instead of initiating the request message in the processor 11 of the printer 10.

The message 25 may be transmitted by way of a port on the printer 10 and a cable connecting the printer to the computer 20. Alternatively, the message may be transmitted via wireless (e.g., infrared or radio frequency) link to the computer 20. The printer 10 may also be connected to computer 20 through a network such as a local area network (LAN), wide area network (WAN) or other network enabling users to share the printer 10. If the printer 10 is connected to computer 20 via a network that has a plurality of connected computers, then the request includes an identification of the particular computer or user identification to which the request is to be sent. For example, the user may enter a host identifier into the printer. This may be accomplished using the touch sensitive display input 15 or alphanumeric keys on the printer 10 to enter the host identifier or user identifier.

The request message 25 requests data that are not currently stored in the printer 10 when the request message is transmitted. The CPU 21 may be coupled to receive the signals from the controls by way of an application specific integrated circuit (ASIC) or a printed circuit card, for example.

In some embodiments, the request message 25 only includes the information needed to initiate the print operation, e.g., a command to print. In some other embodiments, a second type of message may be transmitted from the printer 10 to the computer 20, specifying printer settings, for example. In other alternative embodiments, printer setting information may be included in the request message 25, so that only a single message is used to set print control settings and initiate the print operation.

The general purpose computer 20 includes a processor 21 capable of executing at least one program, such as application program 32. The computer also includes a print driver 33, which interfaces between the application program 32 (or the underlying operating system) and the printer 10. The driver 33 receives commands from the application program 32 (or operating system) and translates them to commands that the printer 10 "understands." The computer 20 also runs a printer status monitor program 34, which displays on the computer the status of the printer 10. The printer status monitor 34 receives information from the printer 10 identifying conditions such as "tray open," "paper jam" or "out of paper," and displays the printer status information on the monitor of the computer 20. In the exemplary embodiment, the printer status monitor 34 also is responsive to receipt of message 25 to recognize a condition in which the controls 12, 14 or 15 are activated.

The printer status monitor responds to the request 25 by sending a signal 27 to the application program 32 or the print driver 33, to cause execution of a print operation, which has not previously been initiated in the general purpose computer. For example, if the request is to initiate a print operation without changing any default printer settings, then the signal 27 can be sent only to the application. If the request is to change print settings without starting the print operation, then the request may be sent to either the application 32 or the print driver 33.

The computer 20 may be a microcomputer, workstation, mainframe, or any other general purpose computer. The processor 21 may be a CPU running any of a variety of operating systems such as "WINDOWS®," UNIX, LINUX, and the like. The processor has data stored in a memory device 31, such as random access memory RAM, EEPROM, or other non-volatile storage medium.

The data are generated by, or capable of being used by, the program 32 running in computer 20. The data may be stored as a file in a storage device, encoded as binary (ASCII or EBCDIC) data, for example. The data may be a set of inputs to the application program, a set of outputs from the program, or a textual or graphical display representing the current view of the application. The storage may be a hard disk, removable storage device or the like. Alternatively, the data may be resident in the memory 31 of the computer 20. For example, the data may be in use within memory cells of a computer program 32 running on computer 20.

The computer 20 includes means for receiving the request from the printer 10. The receiving means may include a port on the computer 20 and a transmission path from the port to the CPU 21. The port is preferably of the same type as the port of the printer. Alternatively, an appropriate adapter may be used, such as an adapter between a universal serial bus (USB) port and a serial (e.g., RS-232) connector. The transmission path may include, for example, a communications board connected to the motherboard of the computer.

The computer 20 includes means responsive to the request message 25 for executing a print operation. The print operation transmits the requested data 26 to the printer 10. In the exemplary embodiment, the printer operation executing means may include software program code causing the processor 21 to execute the print operation. Preferably, the print operation is performed without requiring additional user input after the request 25 is received by the computer 20. For example, keystroke simulation or an application specific programming language may be used to command the application 32 to print. The keystroke simulation or application specific command 27 may be generated and sent by the printer status monitor 34. The application then transmits commands and data by way of the print driver 33. This allows a user to initiate the print operation from the printer 10, without walking over to the computer 20. No user action is required to initiate the print operation except by way of the print control 12, 15 or other control located on the printer.

In one embodiment, wherein one or more application programs 32 are being executed on the computer 20, a print operation is performed from the application in the foreground (i.e., the application having the focus). The application may use a set of default print parameters while sending the data 26 to the printer 10. The data 26 that are sent to the printer 10 would be formatted according to the output format that the application program uses when executing a print operation initiated from the computer.

In another embodiment, it is not necessary for an application to be running on the computer 20. A means is provided for selecting a file from the printer 10. In some embodiments, this may include a mechanism for inputting a fully qualified path name of the file from the printer 10. This may be accomplished using the touch sensitive display input 15 or alphanumeric keys on the printer 10 to enter the name. In a preferred embodiment, the processing of the file depends on the name of the file. For example, in a "WINDOWS®" environment, the extension of the file (e.g., ".doc", ".xls", ".pdf", etc.) often identifies the application program into which the data in the file are input. The computer 20 can then execute the command(s) to cause the printer to print the file, using processing associated with that application.

In some embodiments, the printer further comprises at least one setting control 14 or 15 located on the printer 10 for specifying at least one print setting. The settings may be, for example, darkness, number of copies, duplexing, reduction, enlargement, paper tray, paper size, paper weight, collation and the like. In these embodiments, the printer 10 transmits information to the computer 20 requesting that a default printer setting in the computer be replaced with the setting specified using the controls 14 or 15 on the printer. Upon receipt, the computer 20 uses the settings specified on the printer 10, to change the printer settings of the application program 32, or change the printer settings of the print driver 33. As a general rule, settings specified by the application program 32 override any default settings of the print driver 33, and settings of the print driver 33 override any default settings of the printer 10. Regardless of whether the application or driver settings are changed, when a print operation is executed, the computer 20 formats the output 26 according to the settings specified using the controls 12, 14 or 15 on the printer 10. The printer 10 is not required to transform the data or override any of the settings specified by the application program 32 or print driver 33.

In an alternative embodiment, the printer 10 includes means for overriding any default print controls received from the computer 20 with the settings specified using the setting control 14 on the printer. In this embodiment, the request message 25 does not have to specify print settings. Settings changes are stored and implemented in the printer 10. For example, the default print settings may be stored in memory 13, and any corresponding inputs from print controls 14 or 15 can be used to override the default settings.

In another embodiment, a printer control panel (not shown) may optionally be displayed on the monitor of the computer 20 (for example, as a part of the printer status monitor 34) in response to the request message 25. In this case, the user can optionally interact with the control panel displayed at computer 20, and may change the default print settings. If the user does not interact with the printer control panel at the computer 20, then printing proceeds automatically, using the information entered on the printer.

Figure 3:
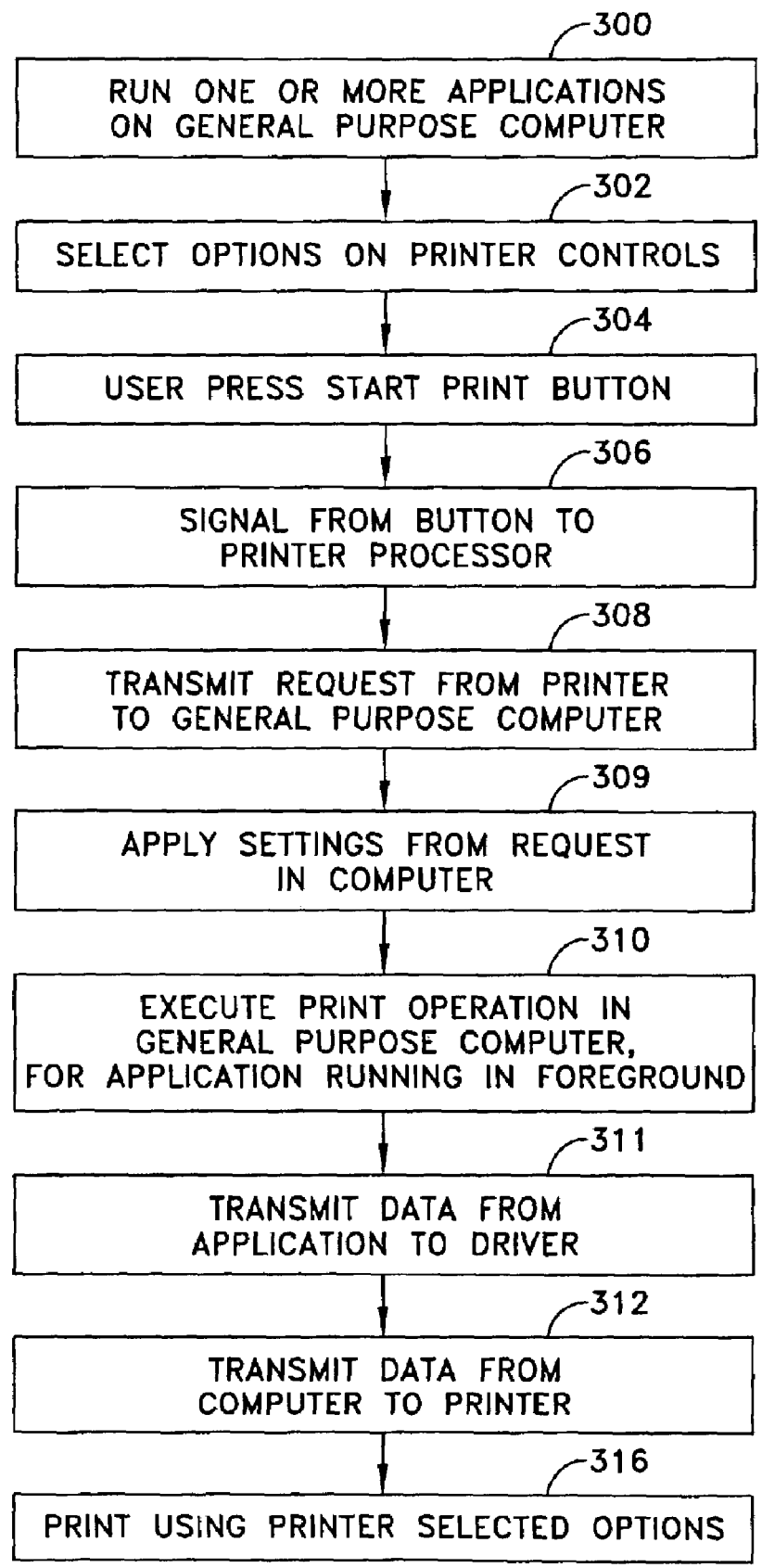
FIG. 3 is a flow chart diagram of an embodiment showing operation of the system of FIG. 1.

FIG. 3 is a flow chart diagram of operations performed using the system 30 described above.

At block 300, the computer 20 runs one or more application programs.

At block 302, a user optionally selects printing settings using controls located on the printer 10. The settings may be, for example, darkness, number of copies, duplexing, reduction, enlargement, paper tray, paper size, paper weight, collation and the like.

At block 304, the user initiates the print operation (which has not previously been initiated) from the printer 10, by activating a control on the printer. The control may include a button 12, a touch sensitive display 15, or the like.

At block 306, the activation of the control causes a signal to be sent to the processor 11 of the printer.

At block 308, the printer 10 transmits a signal 25 to the computer 20, specifying print settings and/or requesting a print operation.

At block 309, the settings entered on the printer are applied in the computer 20. In some embodiments, these settings are transmitted only to the application program 32 running in the foreground, and are only used by that program. In some embodiments, the settings are transmitted to the print driver 33, and are used for print operations by all application programs until changed again by the user.

At block 310, a print operation that was not previously initiated in the general purpose computer (i.e., was not initiated in the general purpose computer before receipt of signal 25) is executed in the general purpose computer 20, either by the application program 32 currently running in the foreground (the application having the focus), or by the application program 32 associated with a selected file (if a fully qualified path name is input by way of the printer 10).

At block 311, the application program 32 transmits the data to the print driver 33. The print driver 33 translates the data to the format understood by the printer 10.

At block 312, the data to be printed are transmitted from the computer 20 to the printer 10.

At block 316, the data are printed using the selected settings.

Figure 4:
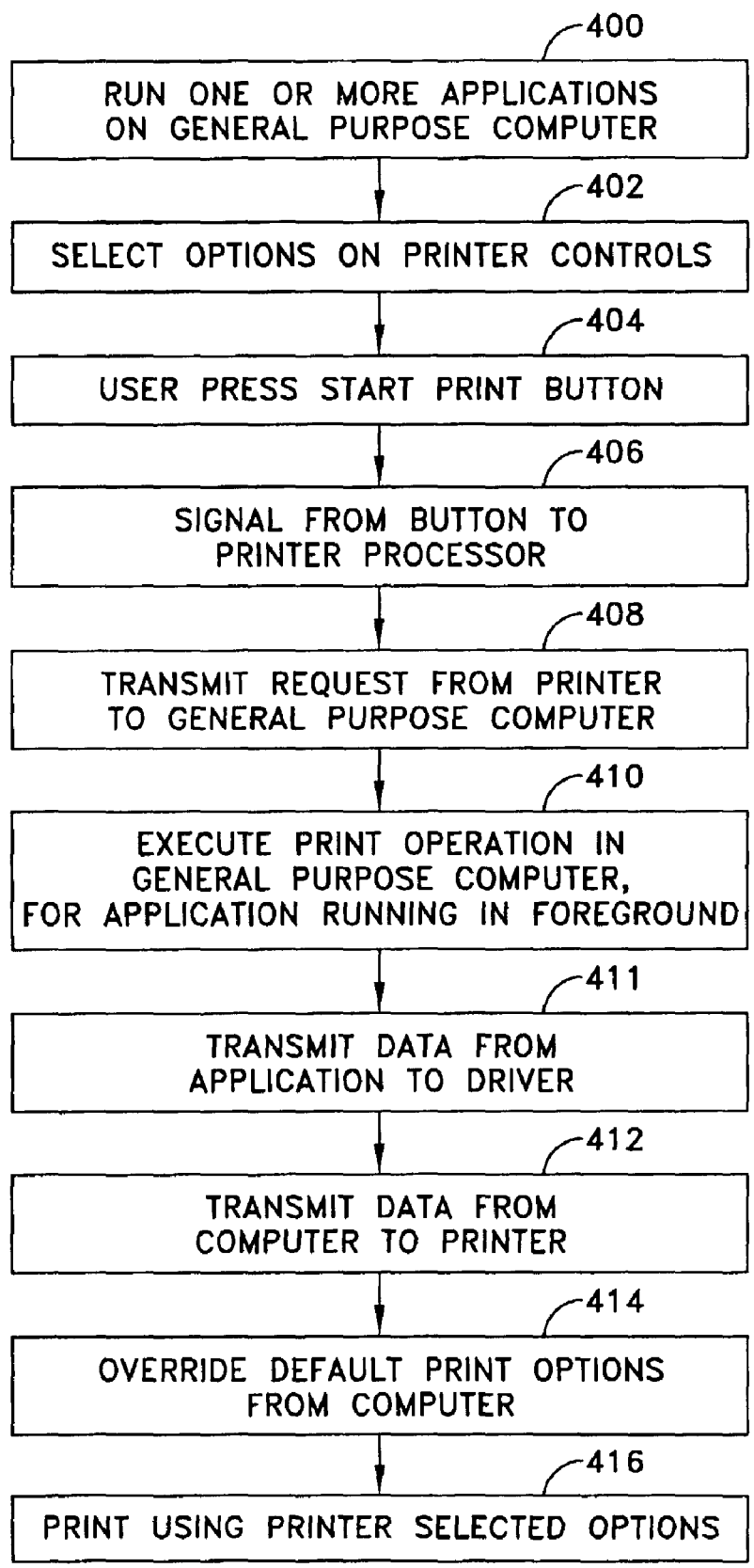
FIG. 4 is a flow chart diagram of an embodiment showing a variation of the operation of FIG. 3.

FIG. 4 is a flow chart diagram of an embodiment showing a variation of the operation of FIG. 3. This variation may be desirable in systems where printer settings are more typically entered by way of printer controls instead of operating system settings. For example, computers running the DOS operating system typically use settings entered at the printer.

At block 400, the computer 20 runs one or more application programs.

At block 402, a user optionally selects printing settings using controls located on the printer 10.

At block 404, the user initiates a print operation that has not previously been initiated from the printer 10, by activating a control on the printer.

At block 406, the activation of the control causes a signal to be sent to the processor 11 of the printer.

At block 408, the printer 10 transmits a signal 25 to the computer 20, specifying print settings and/or requesting a print operation.

At block 410, a print operation (that was not initiated in the computer prior to receipt of signal 25) is executed in the general purpose computer 20, either by the application program 32 currently running in the foreground (the application having the focus), or by the application program 32 associated with a selected file, if a fully qualified path name is input by way of the printer 10.

At block 411, the application program 32 transmits the data to the print driver 33.

At block 412, the data to be printed are transmitted from the computer 20 to the printer 10.

At block 414, the printer overrides the default printer settings provided by the application, using any print settings manually entered using the printer controls 14 and/or 15 of FIG. 2.

At block 416, the data are printed using the selected settings.

It is understood that the controls and functions described above may be combined with a variety of other printer functions. For example, when a print operation is initiated from the printer 10 as described above, the data are ultimately stored in the memory 13 of the printer, and are available for mopier functions, to make additional copies. The controls and functions described herein do not preclude any conventional or future printer functions from being used.

The present invention may be embodied in the form of computer-implemented processes and apparatus for practicing those processes. The present invention may also be embodied in the form of computer program code embodied in tangible media, such as floppy diskettes, random access memories (RAMs), read only memories (ROMs), CD-ROMs, hard drives, "ZIP™", or "JAZ™" disks, DVDs, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for printing, comprising the steps of:
   (a) receiving a signal at a printer;
   (b) transmitting a request in response to the signal for initiating a print operation that has not previously been initiated, the request being transmitted from the printer to a general purpose computer that has data stored therein;

(c) receiving the data from the computer at the printer after step (b) in response to the request; and (d) printing the data in the printer.

2. The method of claim 1, wherein the computer has an application program running on a processor thereof, and the request causes the application program to execute a print operation.

3. The method of claim 2, wherein the computer has at least two application programs running on the processor thereof, one of the two application programs running in the foreground, and the request causes the application program running in the foreground to execute a print operation that sends the data to the printer.

4. The method of claim 1, further comprising the steps of:

specifying at least one print setting using a control located on the printer; and transmitting information to the computer requesting that a default print control in the computer be replaced with the setting specified using the control on the printer.

5. The method of claim 4, wherein the settings are selected from the group consisting of darkness, number of copies, duplexing, reduction, enlargement, paper tray, paper size, collation and paper type.

6. The method of claim 1, further comprising the steps of:

specifying at least one print setting using a control located on the printer; and overriding a default print setting received from the computer with the setting specified using the control on the printer.

7. A computer readable medium encoded with computer program code such that, when the computer program code is executed by a processor in a printer, the printer performs a method comprising the steps of:

(a) receiving a signal at the printer;

(b) transmitting a request in response to the signal for initiating a print operation that has not previously been initiated, the request being transmitted from the printer to a general purpose computer that has data stored therein;

(c) receiving the data from the computer into the printer after step (b) in response to the request; and (d) printing the data in the printer.

8. The computer readable medium of claim 7, wherein the method further comprises the steps of:

specifying at least one print setting using a control located on the printer; and transmitting information to the computer requesting that a default print setting in the computer be replaced with the setting specified using the control on the printer.

9. The computer readable medium of claim 8, wherein the setting is selected from the group consisting of darkness, number of copies, duplexing, reduction, enlargement, paper tray, paper size, collation and paper type.

10. The computer readable medium of claim 7, wherein the method further comprises the steps of:

specifying at least one print setting using a control located on the printer; and overriding a default print setting in the computer with the setting specified using the control on the printer.

* * * * *